United States Patent
Chen et al.

(10) Patent No.: US 11,008,412 B2
(45) Date of Patent: May 18, 2021

(54) METHOD OF POLYMERIZING AN OLEFIN

(71) Applicant: Dow Global Technologies LLC, Midland, MI (US)

(72) Inventors: Linfeng Chen, Missouri City, TX (US); Mehmet Demirors, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/331,658

(22) PCT Filed: Sep. 21, 2017

(86) PCT No.: PCT/US2017/052603
§ 371 (c)(1),
(2) Date: Mar. 8, 2019

(87) PCT Pub. No.: WO2018/063900
PCT Pub. Date: Apr. 5, 2018

(65) Prior Publication Data
US 2019/0241687 A1    Aug. 8, 2019

Related U.S. Application Data

(60) Provisional application No. 62/401,362, filed on Sep. 29, 2016.

(51) Int. Cl.
| | | |
|---|---|---|
| C08F 210/16 | (2006.01) | |
| C08F 210/02 | (2006.01) | |
| C08F 210/14 | (2006.01) | |
| C08F 4/654 | (2006.01) | |
| C08F 4/659 | (2006.01) | |
| C08F 4/64 | (2006.01) | |

(52) U.S. Cl.
CPC ........ *C08F 210/16* (2013.01); *C08F 4/64193* (2013.01); *C08F 4/6545* (2013.01); *C08F 4/65912* (2013.01); *C08F 4/65916* (2013.01); *C08F 210/02* (2013.01); *C08F 210/14* (2013.01); *C08F 2410/04* (2013.01); *C08F 2500/02* (2013.01); *C08F 2500/05* (2013.01); Y02P 20/52 (2015.11)

(58) Field of Classification Search
CPC combination set(s) only.
See application file for complete search history.

(56) References Cited

U.S. PATENT DOCUMENTS

| | | | |
|---|---|---|---|
| 3,113,115 A | 12/1963 | Ziegler et al. | |
| 3,257,332 A | 6/1966 | Ziegler et al. | |
| 4,250,288 A | 2/1981 | Lowery, Jr. et al. | |
| 4,319,011 A | 3/1982 | Lowery, Jr. et al. | |
| 4,547,475 A | 10/1985 | Glass et al. | |
| 4,612,300 A | 9/1986 | Coleman, III | |
| 5,519,098 A | 5/1996 | Brown et al. | |
| 5,539,076 A | 7/1996 | Nowlin et al. | |
| 5,919,983 A | 7/1999 | Rosen et al. | |
| 6,034,022 A | 3/2000 | McAdon et al. | |
| 6,723,677 B1 | 4/2004 | Estrada et al. | |
| 6,831,032 B2 | 12/2004 | Spaether | |
| 7,592,286 B2 | 9/2009 | Morini et al. | |
| 8,058,373 B2 | 11/2011 | Stevens et al. | |
| 8,664,343 B2 | 3/2014 | Qin et al. | |
| 8,907,029 B2 | 12/2014 | Wang et al. | |
| 9,255,160 B2 | 2/2016 | Desjardins et al. | |
| 2013/0029125 A1* | 1/2013 | Tse | C08L 23/06 428/220 |
| 2014/0088275 A1 | 3/2014 | Richter-Lukesova et al. | |
| 2014/0128549 A1* | 5/2014 | Kheirandish | C08F 10/06 525/240 |
| 2016/0046745 A1 | 2/2016 | Wang et al. | |

FOREIGN PATENT DOCUMENTS

| | | | |
|---|---|---|---|
| EP | 0705848 A2 | 4/1996 | |
| EP | 0965601 A1 | 12/1999 | |
| WO | WO-9219653 A1 * | 11/1992 | ........... C08F 10/00 |
| WO | 1996012762 | 5/1996 | |
| WO | 99/50318 A1 | 10/1999 | |
| WO | 2007/136494 A2 | 11/2007 | |
| WO | 2016/003878 A1 | 1/2016 | |
| WO | 2017053534 A1 | 3/2017 | |
| WO | 2017058858 A1 | 4/2017 | |
| WO | 2017058981 A1 | 4/2017 | |

OTHER PUBLICATIONS

Primal 352 Product Data Sheet. (Year: NA).*
FI Catalyst for Polym of Olefin.
Huang R et al: "Synergetic Effect of a Nickel Diimine in Ethylene Polymerization with Immpbilized FE-, CR-, and TI-Based Catalysts on MGCL2 Supports", Macromolecules, American Chemical Society, US, vol. 40, No. 9, May 1, 2007, p. 3021-3029, XP001541408.
Young-Chul Lee et al: "Modification of a Ziegler-Natta Catalyst with a Metallocene Catalyst and Its Olefin Polymerization Behavior", Apr. 8, 2004, XP055427293, p. 1259, table 1 & 2.
PCT/US2017/052603, International Search Report and Written Opinion dated Dec. 1, 2017.
PCT/US2017/052603, International Preliminary Report on Patentability dated Apr. 2, 2019.

* cited by examiner

*Primary Examiner* — Catherine S Branch

(57) ABSTRACT

A method of polymerizing an olefin using a combination of a Ziegler-Natta catalyst and an unsupported molecular catalyst in a same reactor at the same time to give a polyolefin product, and the polyolefin product made by the method. Also, methods of preparing the combination of (pro)catalysts.

11 Claims, No Drawings

METHOD OF POLYMERIZING AN OLEFIN

FIELD

The field includes methods of polymerizing an olefin, polyolefins made thereby, and Ziegler-Natta and molecular (pro)catalysts.

INTRODUCTION

Olefins may be polymerized in gas phase, slurry phase, or solution phase polymerization processes comprising reactions catalyzed by molecular catalysts or Ziegler-Natta catalysts. Molecular catalysts are prepared by contacting molecular procatalysts with an aluminoxane such as a methylaluminoxane or boron-based activator such as a (per)fluorophenylboron compound.

Ziegler-Natta catalysts are prepared by contacting Ziegler-Natta procatalysts comprising titanium halides on a magnesium chloride support with an alkylaluminum activator such as triethylaluminum (TEA), triisobutylaluminum (TIBA), diethylaluminum chloride (DEAC), diethylaluminum ethoxide (DEAE), or ethylaluminum dichloride (EADC).

U.S. Pat. No. 4,612,300 to W. M. Coleman, III, mentions a novel catalyst for producing relatively narrow molecular weight distribution olefin polymers. Employs a Ziegler-Natta magnesium halide supported catalyst containing both titanium and vanadium. Catalyst must contain a sufficient quantity of hydrocarbylaluminum, aluminum halide, or combination thereof.

WO 95/11264 A1 to T. E. Nowlin et al. (NOWLIN) mentions polyolefin blends of bimodal molecular weight distribution.

WO 96/12762 A1 to J. A. DeGroot et al. (DEGROOT) mentions polyolefin compositions exhibiting heat resistivity, low hexane-extractives and controlled modulus.

U.S. Pat. No. 6,723,677 B1 to J. V. Estrada et al. (ESTRADA) mentions a high activity Ziegler-Natta catalyst for high molecular weight polyolefins. By controlling the hold-up times, concentrations and temperatures for mixing the components of aluminum, titanium and magnesium based catalyst for solution polymerization it is possible to prepare a catalyst having a high activity, which prepares high molecular weight polyolefins. Generally, a catalyst loses activity and produces lower molecular weight polymer at higher temperatures. The catalyst of [ESTRADA] permits comparable polymers to be produced with higher catalyst activity and at higher reaction temperatures by increasing the concentration of the components used during the preparation of the catalyst.

U.S. Pat. No. 7,592,286 B2 to G. Morini, et al. mentions a process for the preparation of a catalyst component and components therefrom obtained. Catalyst component comprises a Mg compound, a Ti compound and an electron donor compound (ED) selected from alcohol, glycols, esters, ketones, amines, amides, nitriles, alkoxysilanes and aliphatic ethers as essential compounds, comprising two or more steps of reaction involving the use of at least one of said essential compounds as fresh reactant alone or in a mixture in which it constitutes the main component, said process being characterized by the fact that in the last of said one or more reaction steps the essential compound used as a fresh reactant is the ED compound.

US 2014/0088275 A1 to L. Richter-Lukesova et al. (LUKESOVA) mentions a process for the manufacture of a mixed catalyst system for the copolymerization of ethylene with c1-C12 alpha-olefins.

U.S. Pat. No. 9,255,160 B2 to S. Desjardins, et al. mentions multi-metallic Ziegler-Natta procatalysts and catalysts prepared therefrom for olefin polymerizations. Catalyst compositions comprising three or more transition metals increase catalyst efficiency, reduce polydispersity, and increase uniformity in molecular weight distribution when used in olefin, and particularly, linear low density polyethylene (LLDPE), polymerizations. Resulting polymers may be used to form films that may exhibit improved optical and mechanical properties.

SUMMARY

Prior attempts to synthesize a hybrid catalyst that comprises a Ziegler-Natta catalyst and a supported molecular catalyst for use, at the same time, in a single reactor for gas phase and slurry phase polymerization processes have found it necessary to support the molecular catalyst onto the Ziegler-Natta catalyst. This is because morphology control of catalyst particles is critical for gas phase and slurry phase polymerization processes in order to ensure process continuity. But such prior pre-formed hybrid catalysts have drawbacks. The relative contribution from the Ziegler-Natta catalyst and the supported molecular catalyst cannot be easily adjusted in the hybrid catalyst. Also, prior processes of synthesizing hybrid catalysts are complicated and lengthy. A typical synthesis comprises activating an unsupported molecular procatalyst with methylaluminoxane to give an unsupported molecular catalyst, supporting at least some of the unsupported molecular catalyst onto a Ziegler-Natta catalyst to give a hybrid catalyst, and removing any remaining unsupported molecular catalyst from the hybrid catalyst to give a hybrid catalyst composed of a supported molecular catalyst on a Ziegler-Natta catalyst and free of unsupported molecular catalyst. Ziegler-Natta catalysts used to make such hybrid catalysts are mostly limited to silica-supported Ziegler-Natta catalysts.

We (the present inventors) have conceived a technical solution to this problem based on a new magnesium halide-supported titanium procatalyst with low active halide content. The inventive procatalyst may be prepared in a one-pot syntheses. The inventive procatalyst may be used to prepare a new magnesium halide-supported titanium catalyst, which has high catalytic activity and is useful for catalyzing polymerizations that produce polyolefin polymers with broad molecular weight distribution (MWD). The catalytic activity of the inventive catalyst is enhanceable if the inventive catalyst is prepared by contacting the inventive procatalyst with an activator that is a hydrocarbylaluminoxane (instead of with a trialkylaluminum or aluminum halide activator, which are required to activate prior Ziegler-Natta procatalysts). The technical solution enables a method of polymerizing an olefin using a combination of a Ziegler-Natta catalyst and an unsupported molecular catalyst in a same reactor at the same time to give a polyolefin product with improvement in polyolefin density, polyolefin molecular weight, comonomer distribution, or short chain branching distribution. Also provided is the polyolefin product. A polyolefin made by polymerizing at least one olefin monomer with the inventive catalyst beneficially has a lower residual content of active halide compared to a polyolefin made with a standard halide-containing Ziegler-Natta catalyst. Also provided are methods of preparing the combination of (pro)catalysts.

DETAILED DESCRIPTION

The Brief Summary and Abstract are incorporated here by reference. Examples of embodiments include the following numbered aspects.

Aspect 1. A method of polymerizing an olefin using a Ziegler-Natta catalyst and an unsupported molecular catalyst in a same reactor at the same time, the method comprising simultaneously contacting at least one polymerizable olefin in the reactor with the Ziegler-Natta catalyst and the unsupported molecular catalyst in a saturated or aromatic hydrocarbon liquid under effective conditions to give a polyolefin product comprising a mixture of a first polyolefin made by a first polymerization reaction catalyzed by the Ziegler-Natta catalyst and a second polyolefin made by a second polymerization reaction catalyzed by the unsupported molecular catalyst.

Aspect 2. The method of aspect 1 wherein the Ziegler-Natta catalyst is either an enhanced Ziegler-Natta catalyst that consists essentially of a product of a first activation reaction of (A) a hydrocarbylaluminoxane and (B) a magnesium halide-supported titanium procatalyst in (C) a saturated or aromatic hydrocarbon liquid; or the Ziegler-Natta catalyst is a magnesium halide-supported titanium catalyst, wherein the magnesium halide-supported titanium catalyst is a product of a second activation reaction of (B) a magnesium halide-supported titanium procatalyst with a trialkylaluminum compound; wherein the (B) magnesium halide-supported titanium procatalyst has been prepared by contacting (D) a solid particulate consisting essentially of magnesium halide with (E) titanium tetrachloride in the (C) a saturated or aromatic hydrocarbon liquid so as to give the (B) magnesium halide-supported titanium procatalyst; and wherein the unsupported molecular catalyst consists essentially of a product of a third activation reaction of an unsupported molecular ligand-metal complex procatalyst with (A) a hydrocarbylaluminoxane.

Aspect 3. The method of aspect 1 or 2 wherein the contacting comprises: (i) adding a first feed of the Ziegler-Natta catalyst and a second feed of the unsupported molecular catalyst into the reactor, which contains the at least one polymerizable olefin, wherein the first and second feeds are different; (ii) adding a first feed of the Ziegler-Natta catalyst into the reactor and preparing the unsupported molecular catalyst in situ in the reactor, wherein the unsupported molecular catalyst is prepared in situ in the reactor by adding a third feed containing the unsupported molecular ligand-metal complex procatalyst and a fourth feed containing the (A) hydrocarbylaluminoxane into the reactor, which contains the at least one polymerizable olefin, wherein the first and third feeds are the same or different and wherein the first and fourth feeds are the same or different, with the proviso that the third and fourth feeds are different; (iii) adding a second feed of the unsupported molecular catalyst into the reactor and preparing the Ziegler-Natta catalyst in situ in the reactor, wherein the Ziegler-Natta catalyst is prepared in situ in the reactor by adding a fifth feed containing the suspension of the (B) magnesium halide-supported titanium procatalyst in the (C) saturated or aromatic hydrocarbon liquid and free of (lacking) the trialkylaluminum and a sixth feed containing the (A) hydrocarbylaluminoxane and containing the trialkylaluminum, into the reactor, which contains the at least one polymerizable olefin, wherein the second and fifth feeds are the same or different and wherein the second and sixth feeds are the same or different, with the proviso that the fifth and sixth feeds are different; or (iv) adding a seventh feed of the suspension of the (B) magnesium halide-supported titanium procatalyst in the (C) saturated or aromatic hydrocarbon liquid and the unsupported molecular ligand-metal complex procatalyst and an eighth feed of the (A) hydrocarbylaluminoxane or a mixture of the (A) hydrocarbylaluminoxane and the trialkylaluminum into the reactor, which contains the at least one polymerizable olefin, wherein the seventh and eighth feeds are different. The eighth feed may consist essentially of the (A) hydrocarbylaluminoxane. The first to eighth feeds may be free of (lack) an aluminum halide or an alkyl aluminum other than the (I) trialkylaluminum where indicated, or both the aluminum halide and the alkyl aluminum, including the (I) trialkylaluminum.

Aspect 4. The method of aspect 2 or 3 (as depends from aspect 2) wherein the first or second activation reaction further comprises contacting at least one of the (B) magnesium halide-supported titanium procatalyst with (G) an organoborate or (H) an organoboron; and/or the third activation reaction further comprises contacting the unsupported molecular ligand-metal complex procatalyst with (G) an organoborate or (H) an organoboron.

Aspect 5. The method of any one of aspects 1 to 4 wherein: (i) the at least one polymerizable olefin is ethylene and the polyolefin product comprises a polyethylene; (ii) the at least one polymerizable olefin is at least one $(C_3-C_{40})$ alpha-olefin and the polyolefin product comprises a poly $((C_3-C_{40})$alpha-olefin); or (iii) the at least one polymerizable olefin is a combination of ethylene and at least one $(C_3-C_{40})$ alpha-olefin and the polyolefin product comprises a poly (ethylene-co-$(C_3-C_{40})$alpha-olefin) copolymer.

Aspect 6. The method of any one of aspects 1 to 5 wherein: (i) the (B) magnesium halide-supported titanium procatalyst is free of Al (molar ratio Al/Mg=0); (ii) the (B) magnesium halide-supported titanium procatalyst is characterized by a molar ratio of Al/Mg from >0 to <0.05; (iii) the magnesium halide of the (B) magnesium halide-supported titanium procatalyst is magnesium chloride; (iv) the magnesium halide of the (B) magnesium halide-supported titanium procatalyst is magnesium bromide; (v) both (i) and (iii); (vi) both (i) and (iv); (vii) both (ii) and (iii); (viii) both (ii) and (iv).

Aspect 7. The method of any one of aspects 1 to 6 wherein: (i) the (D) solid particulate consisting essentially of magnesium halide has a Brunauer, Emmett, Teller (BET) surface area of 200 square meters per gram ($m^2/g$) as measured by BET Surface Area Method, described later; or (ii) the (D) solid particulate consisting essentially of magnesium halide has been prepared by contacting a solution of (F) a dialkylmagnesium compound dissolved in the compound (C) saturated or aromatic hydrocarbon liquid with 1.95 to 2.05 mole equivalents of hydrogen halide to give a suspension of the (D) solid particulate consisting essentially of magnesium halide in the compound (C) saturated or aromatic hydrocarbon liquid; or (iii) both (i) and (ii).

Aspect 8 The method of any one of aspects 1 to 7 wherein the (C) saturated or aromatic hydrocarbon liquid is: (i) a saturated hydrocarbon liquid; (ii) an aromatic hydrocarbon liquid; or (iii) a mixture of saturated hydrocarbon and aromatic hydrocarbon liquids.

Aspect 9. The method of any one of aspects 1 to 8 wherein the (A) hydrocarbylaluminoxane is an alkylaluminoxane, a polymethylaluminoxane, an arylaluminoxane, an aralkylaluminoxane, or a combination of any two or more thereof.

Aspect 10. The method of any one of aspects 1 to 9 wherein the unsupported molecular ligand-metal complex procatalyst comprises an unsupported form of: (i) a cyclopentadienyl ligand-metal complex procatalyst; (ii) a cyclopentadienyl-free ligand-metal complex procatalyst; or (iii) both (i) and (ii).

Aspect 11. A polyolefin product made by the polymerization method of any one of aspects 1 to 10.

Aspect 12. A polymerization method of polymerizing an olefin using an enhanced Ziegler-Natta catalyst and an unsupported or supported molecular catalyst in solution-phase process in a same reactor at the same time, wherein the enhanced Ziegler-Natta catalyst consists essentially of a product of a first activation reaction of (A) a hydrocarbylaluminoxane and (B) a magnesium halide-supported titanium procatalyst in (C) a saturated or aromatic hydrocarbon liquid, wherein the (B) magnesium halide-supported titanium procatalyst has been prepared by contacting (D) a solid particulate consisting essentially of magnesium halide with (E) titanium tetrachloride in the (C) saturated or aromatic hydrocarbon liquid so as to give the (B) magnesium halide-supported titanium procatalyst; and wherein the unsupported or supported molecular catalyst consists essentially of a product of a third activation reaction of an unsupported or supported molecular ligand-metal complex procatalyst with (A) a hydrocarbylaluminoxane and/or (G) an organoborate or (H) an organoboron; the method comprising simultaneously contacting at least one polymerizable olefin in the solution phase in the reactor with the enhanced Ziegler-Natta catalyst and the unsupported or supported molecular catalyst in a saturated or aromatic hydrocarbon liquid under effective conditions to give a polyolefin product comprising a mixture of a third polyolefin made by a third polymerization reaction catalyzed by the Ziegler-Natta catalyst and a fourth polyolefin made by a fourth polymerization reaction catalyzed by the unsupported or supported molecular catalyst. The enhanced Ziegler-Natta catalyst may be any one thereof described in the preceding numbered aspects 2 to 10 or below.

Aspect 13. A catalyst system comprising the enhanced Ziegler-Natta catalyst and unsupported or supported molecular catalyst as described in aspect 12.

Molecular catalyst (unsupported or supported). Molecular catalysts for olefin polymerizations are generally well-known in the art. Molecular catalyst is generally a metal complex with a well-defined structure. The molecular catalyst generally may be a homogeneous single site catalyst that is effective for polymerizing ethylene and alpha-olefins. The molecular catalyst generally may exhibit single-site or multi-site behaviors under polymerization conditions. The unsupported molecular catalyst is a molecular catalyst that is not disposed or deposited on a solid support, but during the inventive method is dissolved in a solvent such as a polymerizable olefin, constituent (C) saturated or aromatic hydrocarbon liquid, or a mixture of any two or more thereof. The molecular catalyst is distinct from the (enhanced) Ziegler-Natta catalyst in solubility, structure, and composition. The molecular catalyst may be soluble in constituent (C) saturated or aromatic hydrocarbon liquid or insoluble therein. The molecular catalyst may be selected from any molecular ligand-transition metal complex catalyst that catalyzes polymerizing olefins in which the transition metal is a Group 3 to 11 element of the Periodic Table of Elements, including the lanthanides and actinides. In some aspects the transition metal is Ti, Zr, Hf, V, or Cr. In some aspects the transition metal is selected from the group of any four of Ti, Zr, Hf, V, and Cr. In some aspects the transition metal is Fe, Co, Ni, or Pd. In some aspects the transition metal is selected from the group of any three of Fe, Co, Ni, and Pd. In some aspects the molecular catalyst is a transition metal complex that can polymerize olefins in solution under high temperature solution process conditions. In some aspects the molecular catalyst may be selected from any one or more of bisphenylphenoxy catalysts, constrained geometry catalysts, imino-amido type catalysts, pyridyl-amide catalysts, imino-enamido catalysts, aminotroponiminato catalysts, amidoquinoline catalysts, bis(phenoxy-imine) catalysts, phosphinimide catalysts, and metallocene catalysts.

The molecular catalyst consists essentially of a product of a third activation reaction of a molecular ligand-metal complex procatalyst with an activator such as (A) a hydrocarbylaluminoxane and/or (I) a trialkylaluminum and/or (G) organoborate and/or (H) organoboron. The (A) hydrocarbylaluminoxane used in the third activation reaction to prepare the molecular catalyst independently may be the same as or different than the (A) hydrocarbylaluminoxane used in the first activation reaction to prepare the enhanced Ziegler-Natta catalyst.

In some aspects the molecular ligand-metal complex procatalyst is the cyclopentadienyl (Cp) ligand-metal complex procatalyst, which is useful for preparing so-called metallocene catalysts. Examples of suitable cyclopentadienyl ligand-metal complex procatalysts are $Cp_2ZrCl_2$; rac-$Et(Ind)_2ZrCl_2$, wherein rac means racemic and $Et(Ind)_2$ is 1,2-di(1-indenyl)ethane dianion; $iPr(Flu)(Cp)ZrCl_2$, wherein iPr(Flu)(Cp) is 9-(alpha,alpha-dimethylcyclopentadienylmethyl)-9H-fluorene dianion.

In some aspects the molecular ligand-metal complex procatalyst is the cyclopentadienyl-free ligand-metal complex procatalyst, which is useful for preparing so-called post-metallocene catalysts, including constrained geometry catalysts. Examples of suitable cyclopentadienyl-free ligand-metal complex procatalysts are a phenoxy-imine ligand-early transition metal complex procatalyst (FI procatalyst), a pyrrolide-imine ligand-Group 4 transition metal complex procatalyst (PI procatalyst), an indolide-imine ligand-Ti complex (II procatalyst), an phenoxy-imine ligand-Group 4 transition metal complex procatalyst (IF procatalyst), an phenoxy-ether ligand-Ti complex procatalyst (FE procatalyst), an imine-pyridine ligand-late transition metal complex procatalyst (IP procatalyst), and an tris(pyrazolyl) borate ligand-Ta complex procatalyst (PB procatalyst).

Examples of suitable molecular ligand-metal complex procatalysts are $(TTSi)CpTiCl_2$, wherein (TTSi)Cp is 1,2,3,4-tetramethyl-5-(trimethylamino(dimethyl)silyl) cyclopentadienyl; and the molecular ligand-metal complex procatalysts described in any one of: U.S. Pat. No. 6,827,976; US 2004/0010103 A1; U.S. Pat. No. 8,058,373 B2, at column 11, line 35, to column 16, line 3; complexes of formula (I) described in WO 2016/003878 A1; the fused ring substituted indenyl metal complexes described in U.S. Pat. No. 6,034,022; the constrained geometry metal procatalysts referenced in the Background of U.S. Pat. No. 6,034,022; the ligand-metal complexes described in U.S. 62/234,910 filed Sep. 30, 2015; the ligand-metal complexes described in U.S. 62/234,791 filed Sep. 30, 2015; and bis((2-oxoyl-3-(3,5-bis-(1,1-dimethylethyl) phenyl)-5-(methyl)phenyl)-(5-2-methyl)propane-2-yl)2-phenoxy)-1,3-propanediyl zirconium (IV) dimethyl, which is disclosed in WO 2007/136494.

Magnesium halide-supported titanium catalyst. The magnesium halide-supported titanium catalyst is a product of a second activation reaction comprising contacting the (B) magnesium halide-supported titanium procatalyst with an activator that is a trialkylaluminum compound. The contacting of the trialkylaluminum compound with the suspension of (B) in (C) may be done in or under an inert atmosphere (e.g., a gas of molecular nitrogen, argon, helium, or mixture thereof) at 0° to 300° C., alternatively 15° to 250° C. and for a time of from >0 minute to 48 hours, alternatively 0.1 minute to 24 hours, alternatively 5 to 120 seconds. Examples of suitable trialkylaluminum compounds are of formula $((C_1-C_{20})alkyl)_3Al$, wherein each $(C_1-C_{20})alkyl$ is independently the same or different. In some aspects the trialkylaluminum compound is triethylaluminum, triisobutylaluminum, or a combination of any two or more thereof.

Enhanced Ziegler-Natta catalyst. The enhanced Ziegler-Natta catalyst may be made by contacting the (A) hydrocarbylaluminoxane with the suspension of (B) magnesium halide-supported titanium procatalyst in (C) saturated or aromatic hydrocarbon liquid so as to activate the (B) magnesium halide-supported titanium procatalyst and give the enhanced catalyst. The formation of the enhanced catalyst may be done in situ in a polymerization reactor or just prior to entering the polymerization reactor. The contacting of (A) with suspension of (B) in (C) may be done in or under an inert atmosphere (e.g., a gas of molecular nitrogen, argon, helium, or mixture thereof) at 0° to 300° C., alternatively 15° to 250° C. and for a time of from >0 minute to 48 hours, alternatively 0.1 minute to 24 hours, alternatively 5 to 120 seconds. The catalytic activity of the enhanced catalyst may be greater than the catalytic activity of the magnesium halide-supported titanium catalyst prepared by contacting (B) with the trialkylaluminum compound. In some aspects catalytic activity of the enhanced catalyst may be further enhanced by also contacting (B) and (A) with the (G) organoborate or the (H) organoboron. The enhanced catalyst may consist essentially of, or consist of, the following elements: Al, C, H, Cl, Mg, O, and Ti. The (B) magnesium halide-supported titanium procatalyst, used to make the enhanced catalyst, may consist essentially of, or consist of, the following elements: Cl, Mg, and Ti.

In some aspects the enhanced catalyst and the (B) magnesium halide-supported titanium procatalyst, used to make the enhanced catalyst, are independently characterized by a molar ratio of Ti to halogen. For example, $0 \leq (N_X-80-4*N_{Ti}) \leq 6$, alternatively $0 \leq (N_X-80-4*N_{Ti}) \leq 4$, alternatively $0 \leq (N_X-80-4*N_{Ti}) \leq 2$; wherein $N_{Ti}$=moles of Ti per 40 moles of Mg in the catalyst and $N_X$=moles of halogen per 40 moles of Mg in the catalyst. In some aspects X is Cl, alternatively Br.

The (A): hydrocarbylaluminoxane or HAO. The alkylaluminoxane may be a polymeric form of a $(C_1-C_{10})$alkylaluminoxane or a polymethylaluminoxane (PMAO). The PMAO may be a polymethylaluminoxane-Improved Performance (PMAO-IP), which is commercially available from AkzoNobel. The $(C_1-C_{10})$alkylaluminoxane may be methylaluminoxane (MAO), a modified methylaluminoxane (MMAO) such as modified methylaluminoxane, type 3A (MMAO-3A), type 7 (MMAO-7), or type 12 (MMAO-12), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, or 1-methylcyclopentylaluminoxane. The arylaluminoxane may be a $(C_6-C_{10})$arylaluminoxane, which may be phenylaluminoxane, 2,6-dimethylphenylaluminoxane, or naphthylaluminoxane. The aralkylaluminoxane may be benzylaluminoxane or phenethylaluminoxane. Typically, the compound (A) is MAO, MMAO, PMAO, or PMAO-IP. The hydrocarbylaluminoxane may be made by a non-hydrolytic process using, or by partial hydrolysis of, trihydrocarbylaluminum compounds according to well-known methods or may be obtained from a commercial source.

The (B) magnesium halide-supported titanium procatalyst. The preparation (B) comprises the step of contacting (D) a solid particulate consisting essentially of magnesium halide with (E) titanium tetrachloride in (C) a saturated or aromatic hydrocarbon liquid to give the (B). The preparation may be done in or under an inert atmosphere (e.g., a gas of molecular nitrogen, argon, helium, or mixture thereof) at 0° to 100° C., alternatively 20° to 35° C. and for a time of from 0.1 minute to 24 hours, alternatively 5 to 12 hours. The (D) used to prepare the (B) may be prepared as described below. The suspension of (B) in (C) may be used in the next step without being separated from each other. When prepared in this way it is not necessary to separate the (B) from the (C) and a suspension of the (B) in (C) a saturated or aromatic hydrocarbon liquid may be used directly, in a one-pot syntheses, with the trialkylaluminum compound or the (A) hydrocarbylaluminoxane to prepare the magnesium halide-supported titanium catalyst or the enhanced catalyst, respectively. (In contrast, additional alkylaluminum halide or aluminum halide compound(s) are typically used to prepare a standard (non-inventive) halide-containing Ziegler-Natta catalyst.) The inventive (B) magnesium halide-supported titanium procatalyst may be distinguished from a conventional magnesium halide-supported titanium procatalyst by virtue of how (B) is prepared, as described herein.

A polyolefin prepared by a polymerization reaction using a standard halide-containing Ziegler-Natta catalyst may have a higher residual active halide content. The actual content may vary within limits as follows: proportionally with the starting halide content in the corresponding standard Ziegler-Natta procatalyst and/or inversely proportional with the activity of the Ziegler-Natta catalyst prepared therefrom. in some aspects the magnesium halide-supported titanium procatalyst has been prepared in such a way so as to have a low residual active halide content, such as in the (B), and thus the magnesium halide-supported titanium catalyst prepared therefrom with the trialkylaluminum compound and the enhanced catalyst prepared therefrom with the (A) hydrocarbylaluminoxane also have low residual active halide content, and thus the product polyolefin prepared by the polymerization method using the magnesium halide-supported titanium catalyst or the enhanced catalyst or the further enhanced catalyst also has low residual active halide content. Active halide means a halide containing compound that, when exposed to moisture or water under ambient conditions (e.g., 25° C. and 101 kPa pressure), undergoes a hydrolysis reaction yielding a hydrogen halide (e.g., HCl).

In some aspects the (B) magnesium halide-supported titanium procatalyst has a total metal content of 94 to 100 mol %, alternatively 96 to 100 mol %, alternatively 98 to 99.5 mol % of Ti and Mg. The suspension of (B) magnesium halide-supported titanium procatalyst in (C) saturated or aromatic hydrocarbon liquid may consist essentially of, or consist of, the following elements: C, H, Cl, Mg, and Ti. The (B) magnesium halide-supported titanium procatalyst in the suspension may consist essentially of, or consist of, the elements Cl, Mg, and Ti.

In some aspects instead of the inventive (B) magnesium halide-supported titanium procatalyst, any one of the magnesium halide-supported titanium procatalysts of U.S. Pat. No. 4,612,300 and US 2014/0080970 A1 may be used in the inventive polymerization method.

The (C) saturated or aromatic hydrocarbon liquid. The compound (C) saturated or aromatic hydrocarbon liquid may be any unsubstituted saturated or aromatic hydrocarbon liquid such as an unsubstituted aromatic hydrocarbon or an unsubstituted alkane. The unsubstituted aromatic hydrocarbon may be toluene or xylene(s). The unsubstituted alkane may be a straight chain alkane, a branched chain alkane such as an isoalkane or mixture of isoalkanes such as ISOPAR E, a cycloalkane such as cycloheptane or methylcyclohexane, or a mixture of any two or more thereof. Suitable (C) saturated or aromatic hydrocarbon liquid are available from commercial sources such as isoalkanes available from ExxonMobil Corp.

In some aspects the (C) saturated or aromatic hydrocarbon liquid in which a first product is prepared may be removed from the first product, and a different (C) material combined with the first product prior to preparing the next product therefrom. The removing may be by methods such as stripping, evaporating, distilling, filtering, or "solvent" exchanging. In other aspects at least some of the (C) saturated or aromatic hydrocarbon liquid in which a first product is prepared is carried through with the first product to a preparation of a next product, which is prepared from the first product, without all or any of the (C) being removed from the first product. This carry through may be accomplished using one-pot preparation methods, which are generally well known in the art. The following examples (i) to (iv) of the latter aspects may use one-pot preparation methods: (i) the (C) saturated or aromatic hydrocarbon liquid in which the (D) solid particulate is prepared (see below) may be the same as the (C) saturated or aromatic hydrocarbon liquid in which the magnesium halide-supported titanium procatalyst is prepared, such as the (C) in which the inventive (B) magnesium halide-supported titanium procatalyst is prepared; (ii) the (C) saturated or aromatic hydrocarbon liquid in which the (B) magnesium halide-supported titanium procatalyst is prepared may be the same as the (C) saturated or aromatic hydrocarbon liquid in which the inventive enhanced catalyst is prepared; (iii) the (C) saturated or aromatic hydrocarbon liquid in which the (B) magnesium halide-supported titanium procatalyst is prepared may be the same as the (C) saturated or aromatic hydrocarbon liquid in which the catalyst system is prepared; or (iv) any two or more of examples (i) to (iii), such as (i) and (ii), (ii) and (iii), or (i), (ii), and (iii).

The (D) solid particulate consisting essentially of magnesium halide. The compound (D) is prepared as described above. The contacting a solution of (F) a dialkylmagnesium compound dissolved in (C) saturated or aromatic hydrocarbon liquid with 1.95 to 2.05 mole equivalents of hydrogen halide to give the (D) solid particulate consisting essentially of magnesium halide may be done in or under an inert atmosphere (e.g., a gas of molecular nitrogen, argon, helium, or mixture thereof) at −25° to 100° C., alternatively 0° to 50° C. and for a time of from 0.1 minute to 10 hours, alternatively 1 to 6 hours. The suspension of (D) in (C) may be used without being separated from each other. It is not necessary to separate the (D) from the (C) and the (D) prepared in this way is unconditioned and may be used directly, in a one-pot syntheses, to prepare the (B) magnesium halide-supported titanium procatalyst. Alternatively, the (D) may be conditioned by contacting it with a conditioning compound containing V, Zr, or Hf at 0° to 50° C., alternatively 20° to 35° C., and for a time of from 0.1 minute to 24 hours, alternatively 1 to 12 hours to form a conditioned (D). The suspension of conditioned (D) in (C) may be used without being separated from each other. It is not necessary to separate the conditioned (D) from the (C) and the conditioned (D) prepared in this way may be used directly, in a one-pot syntheses, to prepare the (B) magnesium halide-supported titanium procatalyst. The contacting of (D) with a conditioning compound may be performed before, during, or after the contacting of (D) with (E) titanium tetrachloride. When prepared in this way a suspension of the (D), unconditioned or conditioned, in (C) saturated or aromatic hydrocarbon liquid may be contacted with (E) titanium tetrachloride so as to give the (B) magnesium halide-supported titanium procatalyst.

The (D) solid particulate consisting essentially of magnesium halide may have a BET surface area of ≥200 m$^2$/g, alternatively >250 m$^2$/g, alternatively >300 m$^2$/g, alternatively >350 m$^2$/g. In some aspects the (D) may have a maximum BET surface area of 1,500 m$^2$/g, alternatively 1,000 m$^2$/g, alternatively 500 m$^2$/g, alternatively 300 m$^2$/g, all as measured by the BET Surface Area Method. When the halide is chloride, the magnesium halide is MgCl$_2$ and when the halide is bromide, the magnesium halide is MgBr$_2$.

The suspension of (D) solid particulate consisting essentially of magnesium halide in (C) saturated or aromatic hydrocarbon liquid may consist essentially of, or consist of, the following elements: C, H, Cl, and Mg. The suspension of (D) may have a halide to magnesium ratio of 1.5 to 2.5, alternatively 1.8 to 2.2, alternatively 1.95 to 2.05.

The (E) titanium tetrachloride is a compound of formula TiCl$_4$, or a solution of TiCl$_4$ in a saturated or aromatic hydrocarbon liquid such as a same or different compound (C) saturated or aromatic hydrocarbon liquid. TiCl$_4$ and the solution thereof are available from commercial sources or may be readily prepared by well-known methods.

The (F) dialkylmagnesium compound may be of formula (I): $R^1MgR^2$ (I), wherein each of $R^1$ and $R^2$ is independently an unsubstituted (C$_1$-C$_{20}$)alkyl group, alternatively an unsubstituted (C$_1$-C$_{10}$)alkyl group, alternatively an unsubstituted (C$_1$-C$_4$)alkyl group. In some aspects the dialkylmagnesium compound is an unsubstituted (C$_1$-C$_4$)alkyl group, which is dimethylmagnesium, diethylmagnesium, dipropylmagnesium, isopropyl-methyl-magnesium (i.e., (CH$_3$)$_2$CHMgCH$_3$), dibutylmagnesium, butyl-ethyl-magnesium (i.e., CH$_3$(CH$_2$)$_3$MgCH$_2$CH$_3$), butyl-octyl-magnesium (i.e., CH$_3$(CH$_2$)$_3$Mg(CH$_2$)$_7$CH$_3$), or a combination thereof. Dialkylmagnesium compounds are available commercially or may be readily prepared by well-known methods.

The (G) organoborate. Compound (G) may be any organoborate that enhances the method of polymerization using ethylene monomer. In some aspects (G) is a fluoroorganoborate compound, e.g., a (per)fluoroaryl borate, such as N,N-dimethylanilinium tetrakis(pentafluorophenyl)borate, triphenylcarbenium tetrakis(pentafluorophenyl)borate, N,N-dimethylanilinium tetrakis[3,5-bis(trifluoromethyl)phenyl]borate, or triphenylcarbenium tetrakis[3,5-bis(trifluoromethyl)phenyl]borate, or a mixture of any two or more thereof. In some aspects compound (G) is a methyldi((C$_{14}$-C$_{18}$)alkyl)ammonium salt of tetrakis(pentafluorophenyl)borate, which may be prepared by reaction of a long chain trialkylamine (Armeen™ M2HT, available from Akzo-Nobel, Inc.), HCl and Li[B(C$_6$F$_5$)$_4$]. Such a preparation is disclosed in U.S. Pat. No. 5,919,983, Ex. 2. Or the borate is purchased from Boulder Scientific. The borate may be used herein without (further) purification.

The (H) organoboron. Compound (H) may be any organoboron that enhances the method of polymerization using ethylene monomer. In some aspects compound (H) is a fluoroorganoboron compound. In some aspects compound (E) is a tris(perfluoroaryl)borane such as tris(pentafluorophenyl)borane, tris[3,5-bis(trifluoromethyl)phenyl]boron, or a mixture of any two or more thereof.

The (I) trialkylaluminum. The trialkylaluminum may be of formula $((C_1-C_{10})alkyl)_3Al$, wherein each $(C_1-C_{10})alkyl$ is independently the same or different. Each $(C_1-C_{10})alkyl$ may be methyl, ethyl, propyl, 1-methylethyl, butyl, 1-methylpropyl, hexyl, or octyl. E.g., triethylalum inum, triisobutylaluminum, tripropylaluminum, tributylaluminum, trihexylaluminum, or trioctylaluminum.

The (J) conditioning compound. The (J) conditioning compound may be zirconium-based, hafnium-based, or vanadium based. E.g., tetrakis(2,2,6,6-tetramethyl-3,5-heptanedionato) zirconium, zirconium tetraisopropoxide, tetrakis(2,2,6,6-tetramethyl-3,5-heptanedionato) hafnium, hafnium tetraisopropoxides, vanadium bis(acetylacetonato) oxide, or vanadium trichloride oxide. Functions to increase Mz/Mw ratio of product polyolefin produced by the polymerization method relative to Mz/Mw ratio of a product polyolefin produced by the polymerization method lacking (J). In some aspects the (J) conditioning compound may be an alkylaluminum. The (B) magnesium halide-supported titanium procatalyst may be obtained by contacting a titanium halide (e.g., titanium chloride) or titanium non-halide (e.g., titanium alkoxide) with the (D) after the (D) has been conditioned with the (J) conditioning compound Hydrogen halide. The halide of the hydrogen halide used to prepare the (B) magnesium halide-supported titanium procatalyst is the same as the halide of the magnesium halide of the (B) magnesium halide-supported titanium procatalyst. E.g., both are chloride, alternatively both are bromide. Anhydrous. The mole equivalents of hydrogen halide to (F) dialkylmagnesium compound may be 1.95 to 2.05, alternatively 2.00 to 2.05.

Polymerizable olefins. Examples of suitable polymerizable olefins include ethylene $(CH_2CH_2)$ and $(C_3-C_{40})$alpha-olefins. The polymerizable olefin may comprise a mixture of ethylene and a $(C_3-C_{40})$alpha-olefin. The $(C_3-C_{40})$alpha-olefin may be from 0.1 wt % to 20 wt %, alternatively from 0.1 to 15 wt %, alternatively 0.1 to 10 wt %, alternatively 0.1 to 5 wt % of the mixture and ethylene the remainder. The $(C_3-C_{40})$alpha-olefin may be a $(C_3-C_{20})$ alpha-olefin, alternatively a $(C_3-C_{12})$alpha-olefin, alternatively a $(C_3-C_8)$alpha-olefin. Examples of the $(C_3-C_8)$alpha-olefin are propene, 1-butene, 1-hexene, and 1-octene. The enhanced Ziegler-Natta catalyst and/or the molecular catalyst may be used to polymerize ethylene to give a polyethylene. Alternatively, the enhanced Ziegler-Natta catalyst and/or the molecular catalyst may be used to polymerize a $(C_3-C_{40})$ alpha-olefin to give a poly($(C_3-C_{40})$ alpha-olefin) polymer. Alternatively, the enhanced Ziegler-Natta catalyst and/or the molecular catalyst may be used to copolymerize ethylene and at least one $(C_3-C_{40})$alpha-olefin to give a poly(ethylene-co-$(C_3-C_{40})$alpha-olefin) copolymer. Polymerizations may be done in any suitable rector such as a batch reactor or in a continuous reactor such as a continuous solution polymerization reactor.

Method of polymerizing an olefin. The first and second feeds are different from each other and from the third feed. The mixture of the third feed may be prepared in the reactor or outside of the reactor. The mixture of the third feed may be prepared by mixing the suspension of the (B) magnesium halide-supported titanium procatalyst in the (C) saturated or aromatic hydrocarbon liquid, or the suspension of the enhanced Ziegler-Natta catalyst in the (C) saturated or aromatic hydrocarbon liquid, with the molecular catalyst, or with the molecular ligand-metal complex procatalyst and the (A) hydrocarbylaluminoxane and/or (I) trialkylaluminum.

The mixture of the third feed may be prepared from 0.01 to 120 minutes, alternatively from 0.1 to 60 minutes, alternatively from 1 to 30 minutes, before the contacting step; and at a temperature from 0° C. to 100° C. The length of time between preparation of the mixture of the third feed and the contacting step of the method is adjusted based on the temperature of the mixture, or vice versa, in such a way that the mixture of the third feed functions to catalyze the polymerization of the at least one polymerizable olefin in a manner similar to the function of the separate first and second feeds catalyzing the polymerization of the at least one polymerizable olefin. The lower the temperature at which the mixture of the third feed is prepared, the longer is the time, if desired, between its preparation and the contacting step that may be used. Conversely, the higher the temperature at which the mixture of the third feed is prepared, the shorter is the time that may be used between its preparation and the contacting step.

In the polymerization method, the Ziegler-Natta catalyst may be used as one would use a Ziegler-Natta catalyst to catalyze polymerization of at least one (e.g., 1, 2, or more) polymerizable olefins. The molecular catalyst may be used as one would use a molecular catalyst to catalyze polymerization of at least one (e.g., 1, 2, or more) polymerizable olefins. The Ziegler-Natta catalyst and molecular catalyst independently may catalyze polymerization of the same or different polymerizable olefins. The method may be a slurry process conducted at a temperature from 0° to 100° C. Alternatively, the method may be a gas phase process conducted at a temperature from 30° to 120° C. Alternatively, the method may be a solution process conducted at a temperature from 100° to 250° C. The pressure may be 150 psi to 3,000 psi (1 megapascal (MPa) to 21 MPa).

The method of polymerizing an olefin may be carried out in a polymerization reaction mixture containing at least one polymerizable olefin, the molecular catalyst, and the Ziegler-Natta catalyst. The polymerization reaction mixture may contain an additional amount of (C) saturated or aromatic hydrocarbon liquid as a diluent or solvent so as to avoid oversaturating the (C) with polymer product, and thereby reducing catalyst efficiency. In some aspects the amount of polymer product in the polymerization reaction mixture is less than or equal to 30 wt %. The polymerization reaction mixture may be agitated (e.g., stirred) and the temperature of the polymerization reaction mixture may be controlled by removing heat of reaction therefrom so as to optimize the polymerization. In the method of polymerizing an olefin the enhanced catalyst is used in a catalytically effective amount, such as from 0.0001 to 0.1 milligram-atoms of Ti per liter (L) of the polymerization reaction mixture. The method of polymerizing an olefin may be a batch method, semi-continuous method, or a continuous method. The continuous method continuously supplies reactants to the reactor and removes polymer product from the reactor. The semi-continuous method periodically adds reactants to the reactor and periodically removes polymer product from the reactor. The batch method adds reactants to the reactor and then removes polymer product from the reactor after the polymerization reaction is finished.

An example of a method of polymerizing uses a stirred-tank reactor, into which the polymerizable olefin(s) are introduced continuously together with any additional amount of (C) (C) saturated or aromatic hydrocarbon liquid. The reactor contains a liquid phase composed substantially of ethylene, and optionally a $(C_3-C_{40})$alpha-olefin, (C) and dissolved polymer product. The catalysts and/or their procatalysts and activators are continuously or intermittently introduced into the reactor liquid phase, or any recycled portion thereof. The reactor temperature and pressure may be controlled by adjusting the solvent/olefin ratio, the catalyst addition rate, as well as by cooling or heating coils, jackets or both. The extent of the polymerization reaction may be controlled by the rate of catalyst(s) addition. The ethylene content of the polymer product is determined by the ratio of ethylene to $(C_3-C_{40})$alpha-olefin, if any, in the reactor, which is controlled by manipulating the respective feed rates of these components to the reactor. The polymer product's molecular weight is controlled, optionally, by controlling other polymerization variables such as the temperature, olefin concentration(s), or by feeding molecular hydrogen at a controlled rate into the reactor. If used, the molecular hydrogen may have a concentration of 0.001 to 1 mole percent per 1 mole of ethylene. Upon exiting the reactor, the effluent containing product polymer may be contacted with a catalyst kill agent such as water, steam or an alcohol. The product polymer mixture is optionally heated, and the polymer product recovered by flashing off gaseous or vaporous components such as ethylene, alpha olefin, and component (C), optionally under reduced pressure. If desired, further devolatilization may be done in a devolatilizing extruder. In the continuous process the mean residence time of the catalyst and product polymer in the reactor generally is 1 minute to 8 hours, and alternatively 5 minutes to 6 hours. Alternatively, a continuous loop reactor such as in U.S. Pat. Nos. 5,977,251; 6,319,989; or 6,683,149 and ad rem conditions may be used instead of the stirred tank reactor.

In some aspects the method of polymerizing an olefin is a solution phase process.

Polyolefin product made by the method of polymerizing an olefin. The polyolefin product comprises a polyolefin composition comprising polyolefin macromolecules. The polyolefin product may be a polymer or copolymer. The polymer may be a homopolymer such as polyethylene, a poly(($C_3-C_{40}$)alpha-olefin) polymer such as polypropylene. The copolymer may be a poly(ethylene-co-($C_3-C_{40}$)alpha-olefin) copolymer such as a poly(ethylene-co-propene) copolymer, a poly(ethylene-co-1-butene) copolymer, a poly(ethylene-co-1-hexene) copolymer, or a poly(ethylene-co-1-octene) copolymer. The polyethylene may be a high density polyethylene (HDPE), linear low density polyethylene (LLDPE), medium density polyethylene (MDPE), a very low density polyethylene (VLDPE), a high melt strength high density polyethylene (HMS-HDPE), or a combination of any two or more thereof.

The polyolefin polymer or copolymer may further include one or more additives such as antistatic agents, color enhancers, dyes, lubricants, fillers, pigments, primary antioxidants, secondary antioxidants, processing aids, and ultraviolet (UV) light stabilizers. The resulting additive containing polyolefin (co)polymer may comprise from 0 wt % to 10 wt % of each additive, based on the weight of the additive containing polyolefin (co)polymer. Antioxidants, such as Irgafos™ 168 and Irganox™ 1010, may be used to protect the polyolefin (co)polymer from thermal and/or oxidative degradation. Irganox™ 1010 is tetrakis (methylene (3,5-di-tert-butyl-4hydroxyhydrocinnamate) available from Ciba Geigy Inc. Irgafos™ 168 is tris (2,4 di-tert-butylphenyl) phosphite available from Ciba Geigy Inc.

The polyolefin product made by the method may comprise a first polymer and a second polymer, which is different than the first polymer. The first polymer may be primarily produced by a first polymerization reaction catalyzed by the (enhanced) Ziegler-Natta catalyst. The second polymer may be primarily produced by a second polymerization reaction catalyzed by the molecular catalyst. The ratio of first polymer to second polymer in the polyolefin product may be controlled by controlling the ratio of the (enhanced) Ziegler-Natta catalyst to the molecular catalyst and the amount and selection of the activator(s).

The polyolefin product made by another inventive method may comprise a third polymer and a fourth polymer, which is different than the third polymer. The third and fourth polymers may be different than the first and second polymers. The third polymer may be primarily produced by a third polymerization reaction catalyzed by the (enhanced) Ziegler-Natta catalyst of the hybrid catalyst. The fourth polymer may be primarily produced by a fourth polymerization reaction catalyzed by the supported molecular catalyst. The ratio of third polymer to fourth polymer in the polyolefin product may be controlled by controlling the ratio of the (enhanced) Ziegler-Natta catalyst to the supported molecular catalyst in different embodiments of the hybrid catalyst and the amount and selection of the activator(s).

The polyolefin product may be used in a forming operation to prepare manufactured articles from or comprising the polyolefin product. Examples of such forming operations are film forming, sheet forming, pipe forming, fiber extruding, fiber co-extruding, blow molding, injection molding, and rotary molding. The manufactured articles prepared thereby may be blown or cast films, such as films formed by co-extrusion or lamination; fibers such as melt spun fibers and melt blown fibers for use in non-woven and woven fabrics; extruded articles; and molded articles. The films may be made as shrink films, cling films, stretch films, sealing films, oriented films, snack packaging films, heavy duty bags, grocery sacks, baked and frozen food packaging, medical packaging, industrial liners, agricultural films, and membranes such as food-contact and non-food-contact membranes. The fibers may be made for use in diaper fabrics, medical garments, and geotextiles. The extruded articles may be made as medical tubing, wire and cable coatings, geomembranes, and pond liners. The molded articles may be made as bottles, tanks, large hollow articles, rigid food containers, and toys.

The aspects herein have numerous advantages. In general there are multiple types of active sites in Ziegler-Natta catalysts that result in production of a first polyolef in composition composed of macromolecules with a wide range of different structures. In contrast, molecular catalysts, including unsupported molecular catalysts, typically have a much lower number of active sites, sometimes only one, and thus produce a second polyolefin composition composed of macromolecules having generally uniform or similar structures. Each of the first and second polyolef ins possesses distinct and beneficial properties. Embodiments of the present invention advantageously prepare, in the same reactor at the same time, a third polyolefin composition composed of the first and second polyolefin compositions.

Prior to the present invention, intimate mixing of a standard molecular catalyst and a standard Ziegler-Natta catalyst compromised the performance of each catalyst, including significantly decreasing the catalyst efficiency of the expensive molecular catalyst. Prior to the present invention, in order to avoid that disadvantageous interaction between a Ziegler-Natta catalyst and an unsupported molecular catalyst, artisans used a first reactor for an unsupported molecular catalyst and a second reactor (different than the first reactor) for a Ziegler-Natta catalyst, which greatly increased complexity of the standard process control and equipment. We recognized that for solution polymerization process, particle morphology control is not important since all reactants will be in solution phase at temperatures used in solution-phase polymerization reactions. In embodiments of the present invention different types of unsupported molecular catalysts and the inventive Ziegler-Natta catalyst, including the enhanced Ziegler-Natta catalyst, beneficially can be introduced into a single reactor at the same time and at any desired molar ratio with respect to the other. Further, the inventive method advantageously avoids the prior approach of supporting the prior Ziegler-Natta catalyst on silica, and supporting the prior supported molecular catalyst on the silica-supported Ziegler-Natta catalyst.

An advantage of aspects is that the enhanced Ziegler-Natta catalyst has a higher catalyst efficiency than a comparative catalyst that is prepared in the same way as the preparation of the enhanced Ziegler-Natta catalyst except, instead of using the (A) hydrocarbylaluminoxane as activator, the preparation of the comparative catalyst contacts the (B) magnesium halide-supported titanium procatalyst with triethylaluminum (TEA) as activator, alternatively with ethylaluminum dichloride (EADC) as activator.

Another advantage of some aspects is that the catalyst efficiency of the enhanced Ziegler-Natta catalyst is further enhanced when aspects of the enhanced Ziegler-Natta catalyst are prepared by contacting the (B) magnesium halide-supported titanium procatalyst with (A) hydrocarbylaluminoxane and the (G) organoborate, alternatively the (H) organoboron.

Some advantages enable the enhanced Ziegler-Natta catalyst to be used with an unsupported molecular catalyst, including a single site catalyst, in a same reactor at the same time, whereas a comparative catalyst that is prepared by contacting a comparative magnesium chloride or comparative magnesium chloride-supported titanium procatalyst with an aluminum halide such as EADC is incompatible with the molecular catalyst.

Another advantage is that when the (enhanced) Ziegler-Natta catalyst and the unsupported molecular catalyst are used in a same reactor at the same time, the resulting polymerization may make polyolefin compositions having a significantly higher proportion of low density polyolefin macromolecules compared to proportion of low density polyolefin macromolecules in a polyolefin composition made by the Ziegler-Natta catalyst.

Another advantage is the magnesium halide-supported titanium procatalyst modified with (A) hydrocarbylaluminoxane and without modification using an aluminum halide produces polyethylenes having a higher Mz/Mw ratio than polyethylenes produced with comparative procatalysts that are modified with aluminum halides. Another advantage of some aspects that further contain the (J) conditioning compound is a further enhanced the Mz/Mw ratio.

The term "activator" may be referred to herein interchangeably as a "co-catalyst" or "co-cat." and refers to any compound such as (A), (G), (H), or (I), that reacts with a procatalyst to give a catalyst (catalytically active).

The phrase "early transition metal" means an element of any one of Groups 3 to 5. The phrase "late transition metal" means an element of any one of Groups 8 to 11.

As used here "procatalyst" (also may be referred to as a "precatalyst") means a material that may exhibits no or low polymerization activity (e.g., catalyst efficiency may be 0 or <1,000) in the absence of an activator (e.g., (A), (G), (H), and/or (I)), but upon activation with an activator (e.g., (A), (G), (H), and/or (I)) yields a catalyst that shows at least 10 times greater catalyst efficiency than that of the procatalyst.

The (D) solid particulate consisting essentially of magnesium halide, and the suspension of (D) in the (C) saturated or aromatic hydrocarbon liquid, and the (B) magnesium halide-supported titanium procatalyst prepared from the (D) solid particulate consisting essentially of magnesium halide, and the suspension of the (B) magnesium halide-supported titanium procatalyst in the compound (C) saturated or aromatic hydrocarbon liquid, and the enhanced catalyst prepared from the suspension of the (B) magnesium halide-supported titanium procatalyst in the compound (C) saturated or aromatic hydrocarbon liquid and the (A) hydrocarbylaluminoxane, collectively "inventive materials", are purer than their counterpart incumbent materials. The greater purity of the inventive materials is due in part by virtue of how they are respectively prepared, as described earlier, e.g., having a lower residual active halide content. For example, the respective present methods of preparing the inventive materials (B) and enhanced catalyst avoid using alkylaluminum compounds and aluminum halide compounds, whereas at least some counterpart incumbent materials may have been prepared using alkylaluminum compounds and aluminum halide compounds, which generate undesired by-products. Also, the inventive materials are prepared with simpler reagents such as the (F) dialkylmagnesium compound and hydrogen halide for preparing the (D) solid particulate consisting essentially of magnesium halide instead of Grignard reagents and alkyl chlorides or metal chlorides used to prepare counterpart incumbent materials. Also, the preparation of the enhanced catalyst using the (A) hydrocarbylaluminoxane with the inventive suspension of the (B) magnesium halide-supported titanium procatalyst in the compound (C) saturated or aromatic hydrocarbon liquid is an improvement over incumbent preparations using alkyl aluminum compound or aluminum halide compound with an incumbent titanium/magnesium halide. As used herein, the phrases "consisting essentially of" and "consists essentially of" are partially closed-ended phrases that capture the greater purities of the inventive materials and in this context may mean having 0 wt %, alternatively having >0 mol % to <5 mol %, alternatively >0 mol % to <3 mol %, alternatively >0 mol % to <2 mol % of a material other than the listed materials that follow the phrases, or reactants used to prepare those listed materials.

Unless otherwise defined herein, named general terms have the following meanings. Alternatively precedes a distinct embodiment. Articles "a", "an", and "the" each refer to one or more. ASTM means the standards organization, ASTM International, West Conshohocken, Pa., USA. Any comparative example is used for illustration purposes only and shall not be prior art. Free of or lacks means a complete absence of; alternatively not detectable. Group(s), when referring to a collection of elements, means the Group(s) of the IUPAC Periodic Table of the Elements published May 1, 2013. IUPAC is International Union of Pure and Applied Chemistry (IUPAC Secretariat, Research Triangle Park, N.C., USA). A Markush group of members A and B may be equivalently expressed as: "a member selected from A and B"; "a member selected from the group consisting of A and B"; or "a member A or B". Each member may independently be a subgenus or species of the genus. May confers a permitted choice, not an imperative. NIST is National Institute of Standards and Technology, U.S. Department of Commerce, Gaithersburg, Md., USA. Operative means functionally capable or effective. Optional(ly) means is absent (or excluded), alternatively is present (or included). Properties are measured using a standard test method and conditions for the measuring (e.g., viscosity: 23° C. and

EXAMPLES

Brunauer, Emmett, Teller (BET) Surface Area Method: Measure surface area with a Tristar 3020 Surface Area Analyzer by Micromeritics. Filer 30 mL of a MgCl2 slurry, reslurry in 30 mL hexane, filter the reslurry under inert atmosphere, wash with additional hexane. Repeat the reslurrying, filtering, and washing steps to obtain a filtercake of MgCl2. Remove residual solvent from filtercake under a first vacuum. Further dry the filtercake on a Vac Prep 061 by Micromeritics using a 0.5 inch (1.27 cm) sample tube and a Transeal stopper designed for inert sample protection by loading a 0.2 g sample of the first vacuum-dried MgCl2 into the tube under inert atmosphere and stoppered with Transeal stopper. Connect tube to Vac Prep 061 unit, purging with nitrogen gas while connecting sample. Open Transeal stopper, place tube's contents under second vacuum, place evacuated tube in heating block with an aluminum tube protector. Dry under second vacuum on Vac Prep 061 at 110 C. for 3 hours, introduce nitrogen gas into tube, and allow sample to cool to room temperature before disconnecting tube from Vac Prep 061 to give fully dried sample. Under inert atmosphere, transfer 0.1500 to 0.2000 g of fully dried sample into a clean sample tube, place tube filler rod in tube, seal tube with Transeal stopper, connect to Tristar 3020, and measure surface area. Use QUICKSTART method to acquire the data.

Gel Permeation Chromatography (GPC) Method. Instrument: PolymerChar GPC-IR (Valencia, Spain) high temperature GPC chromatograph equipped with an internal IR5 detector, autosampler, and Polym erChar GPCOne™ software. Temperatures: autosampler oven compartment at 160° C. and column compartment at 150° C. Chromatographic solvent: Nitrogen-sparged 1,2,4 trichlorobenzene that contains 200 parts per million (ppm) of butylated hydroxytoluene (BHT). Injection volume: 200 microliters (μL). Flow rate 1.0 μL/minute. Columns: 3 Agilent "Mixed B" 30 centimeter (cm)×10-micrometer (μm) linear mixed-bed columns and a 10-μm pre-column. Prepare samples using the autosampler targeting 2 milligrams sample per milliliter solvent (mg/mL) in a septa-capped vial that has been nitrogen sparged, and shaking the vial at low speed for 2 hours at 160° C.

GPC Method continued: Calibrate columns with 21 narrow MWD polystyrene (PS) standards from Agilent Technologies and having molecular weights (MW) 580 to 8,400,000 g/mol and arranged in 6 "cocktail" mixtures with at least a decade separation between Mw. Prepare PS standards at 0.025 g in 50 milliliters (mL) of solvent for MW≥1,000,000 g/mol and 0.05 g/mL solvent for MW<1,000,000 g/mol. Convert PS standard peak MW to polyethylene MW as described in Willams and Ward, J. Polym. Sci., Polym. Lett., 1968; 6: 621, using Equation EQ1: $M_{polystyrene}=A \times (M_{polystyrene})^B$ EQ1, wherein M is molecular weight, A equals 0.4315, and B equals 1.0. Use fifth order polynomial t fit respective polyethylene-equivalent calibration points. Make a small adjustment to A (from about 0.415 to 0.44) to correct for column resolution and band-broadening effects such that MW for NIST standard NBS 1475 is obtained at 52,000 g/mol. Monitor deviations over time using a flow rate marker, e.g., decane, in each sample (introduced via micropump) to align flow rate marker peak from sample to flow rate marker peak of PS standards. Use flow rate marker to linearly correct flow rate for each sample by aligning respective sample flow rate marker peaks to respective PS standards flow rate marker peaks. Assume any changes in time of the flow rate marker peak are related to a linear shift in flow rate and chromatographic slope. For best accuracy of RV measurement of the flow rate marker peak, use a least-squares fitting routine to fit the flow rate marker peak of a flow rate marker concentration chromatogram to a quadratic equation. Use PolymerChar GPCOne™ software to process flow rate marker peak.

GPC Method continued: Measure total plate count (Equation EQ2) and symmetry (Equation EQ3) of GPC columns with 0.04 g eicosane dissolved in 50 mL of TCB. EQ2: Plate Count=$5.54 \ast [(RV_{Peak\ Max})$ divided by (Peak Width at ½ height)$]^2$, wherein RV is retention volume (mL), peak width is in mL, peak max is maximum height of peak, and ½ height is half height of peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})}, \quad \text{EQ3}$$

wherein RV and peak width are as defined above, peak max is the maximum position of the peak, one tenth height is 1/10 height of the peak maximum, rear peak is the peak tail at later retention volumes than those of the peak max, and front peak refers to the peak front at earlier retention volumes than the peak max. Plate count should be >24,000 and symmetry should be >0.98 to <1.22.

GPC Method continued: Calculate number average molecular weight (Mn), weight average molecular weight (Mw), and z-average molecular weight (Mz) from GPC results from using internal IR5 detector (measurement channel) of the PolymerChar GPC-IR instrument and PolymerChar GPCOne™ software. Baseline-subtract the IR chromatogram at each equally-spaced data collection point (i), and obtain the polyethylene equivalent Mn, Mw, and Mz from the narrow standard calibration curve for the same point (i) from EQ1.

Crystallization Elution Fraction (CEF) Method is conducted according to Monrabal et al, Macromol. Symp. 257, 71-79 (2007). Equip a CEF instrument with an IR-4 or IR-5 detector (such as that sold commercially from PolymerChar, Spain) and a two-angle light scattering detector Model 2040 (such as those sold commercially from Precision Detectors). Install a 10 micron guard column of 50 mm×4.6 mm (such as that sold commercially from PolymerLabs) before the IR-4 or IR-5 detector in a detector oven. Use ortho-dichlorobenzene (ODCB, 99% anhydrous grade) and 2,5-di-tert-butyl-4-methylphenol (BHT) (such as commercially available from Sigma-Aldrich) and silica gel 40 (particle size 0.2–0.5 mm) (such as commercially available from EMD Chemicals). Dry the silica gel in a vacuum oven at 160° C. for at least two hours before use. Sparge the ODCB with dried nitrogen ($N_2$) gas for one hour before use. Further dry the ODCB by adding five grams of the dried silica to two liters of ODCB or by pumping the ODCB through a column or columns packed with dried silica at a flow rate between 0.1 mL/min. to 1.0 mL/min. Add 800 milligrams (mg) of BHT to two liters of ODCB if no inert gas such as $N_2$ is used in purging a sample vial. Dried ODCB, with or without BHT, is hereinafter referred to as "ODCB-m". Prepare a sample solution using the autosampler by dissolving a polymer sample in ODCB-m at 4 mg/mL with shaking at 160° C. for 2 hours. Inject 300 μL of the sample solution into 101.3 kPa). Ranges include endpoints, subranges, and whole and/or fractional values subsumed therein, except a range of integers does not include fractional values. Room temperature is 23° C.±1° C. unless indicated otherwise.

the column. Use a temperature profile: crystallization at 3° C./min. from 110° to 30° C., thermal equilibrium at 30° C. for 5 minutes (including Soluble Fraction Elution Time being set as 2 minutes), and elution at 3° C./min. from 30° to 140° C. Use a flow rate during crystallization of 0.052 mL/min and a flow rate during elution of 0.50 mL/min. Collect 1 data point of IR-4 or IR-5 signal data/second.

CEF Method continued. Pack a column with glass beads at 125 µm±6% (such as those commercially available with acid wash from MO-SCI Specialty Products) with ⅛ inch stainless tubing according to U.S. Pat. No. 8,372,931. The internal liquid volume of the CEF column is between 2.1 mL and 2.3 mL. Perform temperature calibration using a mixture of NIST Standard Reference Material linear polyethylene 1475a (1.0 mg/mL) and Eicosane (2 mg/mL) in ODCB-m. The calibration consists of: (1) calculating the delay volume defined as the temperature offset between the measured peak elution temperature of Eicosane minus 30.00° C.; (2) subtracting the temperature offset of the elution temperature from the CEF raw temperature data (the temperature offset is a function of experimental conditions, such as elution temperature, elution flow rate, etc.); (3) creating a linear calibration line transforming the elution temperature across a range of 30.00° to 140.00° C. such that NIST linear polyethylene 1475a has a peak temperature at 101.00° C. and Eicosane has a peak temperature of 30.00° C.; (4) for the soluble fraction measured isothermally at 30° C., linearly extrapolate the elution temperature using the elution heating rate of 3° C./min. Reported elution peak temperatures are obtained such that the observed comonomer content calibration curve agrees with those previously reported in U.S. Pat. No. 8,372,931.

The weight percentage of purge fraction (PF; Wt1), low density copolymer component (Wt2), high density copolymer component (Wt3), and high density fraction (HDF; Wt4) are defined as polymer peaks in the following 4 temperature ranges: 25° to 33° C., 33° to 68° C., 68° to 92° C., and 92° to 115° C., respectively. Weight average molecular weights of these four purge fractions are Mw1, Mw2, Mw3, and Mw4, respectively. The contribution of copolymer in the low density range of the overall polymer by the molecular catalyst was reflected in the increased value of Wt2/Wt3, the relative ratio of the amount of the low density copolymer to the higher density of copolymer in the overall polymer obtained. In some aspects the ratio Wt2/Wt3 is from 0.5 to 1.2, alternatively 0.57 to 1.14.

Catalyst efficiency ("Cat. Eff."): calculate Cat. Eff. based on the amount of ethylene consumed during polymerization per gram of Ti and Zr.

Batch reactor. A stirred 1-gallon reactor having a bottom valve.

Batch Reactor Copolymerization Test Method. Charge batch reactor with 250 g of 1-octene and 1330 g of Isopar E. Heat rector contents to 190° C., then saturate contents with ethylene in presence of 40 millimoles (mmol) of molecular hydrogen. Mix suspension of procatalyst (e.g., (B1) or (B2)) in liquid (e.g., (C1)) and activator (e.g., (A1)) in separate flask, and immediately add resulting mixture into the batch reactor. Maintain pressure in the reactor at 3100 kilopascals (kPa; equal to 450 pounds per square inch (psi)) with ethylene flow to compensate for pressure drop due to ethylene consumption during polymerization thereof. After 10 minutes reaction time, open bottom valve and transfer reactor contents into a glass kettle. Pour contents of kettle onto a Mylar lined tray, allow contents to cool, and place tray in fume hood overnight to evaporate most of the liquid. Dry remaining resin in a vacuum oven to give a product poly(ethylene-co-1-octene) copolymer.

Hydrocarbylaluminoxane (A1). Modified methylaluminoxane, type 3A (MMAO-3A) having an approximate molecular formula $[(CH_3)_{0.7}(isoC_4H_9)_{0.3}AlO$. CAS No. 146905-79-5. Obtained as a solution in heptane from AkzoNobel N.V.

Compound (C1). Isopar E fluid.>99.75% to 99.9% of naphtha (petroleum), light alkylate, CAS 64741-66-8, and 0.1 to <0.25% isooctane CAS 540-54-1, (isoalkanes mixture) obtained from Exxon Mobil Corporation. Having boiling range 114° to 139° C.

Particulate $MgCl_2$ (D1). Solid particulate $MgCl_2$ having a BET surface area of 375 to 425 $m^2/g$. Product prepared by diluting a 20 wt % solution of (F1), described below, in heptane into a measured quantity of (C1) to give a diluted solution; adding hydrogen chloride (HCl) slowly to the diluted solution with agitation at 30° C. until the molar ratio of Cl to Mg reaches 2.04:1.00 while maintaining the temperature at 30°±3° C., to give a 0.20 M suspension of (D1) in (C1).

Titanium tetrachloride (E1). $TiCl_4$ obtained from Sigma Aldrich Company

Dialkylmagnesium (F1). Butyl-ethyl-magnesium. A 20 wt % solution in heptane.

Organoborate (G1). Methyldi(($C_{14}$-$C_{18}$)alkyl)ammonium salt of tetrakis(pentafluorophenyl)borate, prepared as described earlier. A mixture in a cycloalkane.

Trialkylaluminum (I1): triethylaluminum (TEA). $(CH_3CH_2)_3Al$ solution in heptane.

Unsupported Molecular Ligand-Metal Complex Procatalyst 1: bis((2-oxoyl-3-(3,5-bis-(1,1-dimethylethyl) phenyl)-5-(methyl)phenyl)-(5-2-methyl)propane-2-yl)2-phenoxy)-1,3-propanediyl zirconium (IV)dimethyl, as disclosed in WO 2007/136494. A mixture in a cycloalkane.

For the following preparations, Ti loading, molar ratio of activator (e.g., TEA) or activator (e.g., (G1)) to titanium ("activator/Ti"), process conditions and data are listed later Table 1.

Preparation 1 (P1): Magnesium chloride-supported titanium procatalyst (B1). Add 0.80 milliliter (mL) of a 0.25 Molar ($\underline{M}$) solution of (E1) in (C1) to 40 mL of the 0.20 $\underline{M}$ suspension of (D1) in (C1), and stir the resulting mixture overnight to give (B1) suspended in (C1).

Preparation 2 (P2): Magnesium chloride-supported titanium procatalyst (B2). Add 2.40 mL of a 0.25 $\underline{M}$ solution of (E1) in (C1) to 40 mL of the 0.20 $\underline{M}$ suspension of (D1) in (C1), and stir the resulting mixture overnight to give (B2) suspended in (C1).

Preparation 3A (P3A): enhanced Ziegler-Natta catalyst. Add 0.40 mL of a 0.125 M solution of (A1) MMAO-3A in heptane to a suspension of P1 to give enhanced Ziegler-Natta catalyst of P3.

Preparation 3B (P3B): enhanced Ziegler-Natta catalyst. Add 0.24 mL of a 0.125 M solution of (A1) MMAO-3A in heptane and 0.24 mL of a 0.003 $\underline{M}$ solution of (G1) in methylcyclohexane to a suspension of P1 to give enhanced Ziegler-Natta catalyst of P3B.

Preparation 3C (P3C): enhanced Ziegler-Natta catalyst. Add 0.50 mL of a 0.125 $\underline{M}$ solution of (A1) MMAO-3A in heptane to a suspension of P1 to give enhanced Ziegler-Natta catalyst of P3C.

Preparation 3D (P3D): enhanced Ziegler-Natta catalyst. Add 0.98 mL of a 0.125 $\underline{M}$ solution of (A1) MMAO-3A in heptane to a suspension of P1 to give enhanced Ziegler-Natta catalyst of P3D.

Preparation 4A (P4A): enhanced Ziegler-Natta catalyst. Add 0.57 mL of a 0.125 M solution of (A1) MMAO-3A in heptane to a suspension of P2 to give enhanced Ziegler-Natta catalyst of P4A.

Preparation 4B (P4B) (prophetic): enhanced Ziegler-Natta catalyst. Replicate the procedure of P3B except use a suspension of P2 instead of the suspension of P1 to give enhanced Ziegler-Natta catalyst of P4B.

Preparation 4C (P4C): enhanced Ziegler-Natta catalyst. Add 1.42 mL of a 0.125 M solution of (A1) MMAO-3A in heptane to a suspension of P2 to give enhanced Ziegler-Natta catalyst of P4C.

Preparation 4D (P4D): enhanced Ziegler-Natta catalyst. Add 0.20 mL of a 1.77 M solution of (A1) MMAO-3A in heptane to a suspension of P2 to give enhanced Ziegler-Natta catalyst of P4D.

In some aspects the invention further includes any enhanced Ziegler-Natta catalyst described herein.

Inventive Example 1 (IE1). Activate unsupported Molecular Ligand-Metal Complex Procatalyst 1 with organoborate (G1) in compound (C1) and then hydrocarbylaluminoxane (A1) to form unsupported Molecular Ligand-Metal Complex Catalyst 1. Combine the unsupported Molecular Ligand-Metal Complex Catalyst 1A with Magnesium chloride-supported titanium procatalyst (B1) of Preparation P1 to yield a catalyst mixture which is used immediately in batch reactor polymerization containing a polymerizable olefin (e.g., ethylene and 1-octene) to produce a polyolefin. Catalyst compositions are reported later in Table 1 and polyolefin characterization data are reported later in Tables 2 and 3.

IE2. Replicate the procedure of IE1 except use twice as much of the organoborate (G1) and hydrocarbylaluminoxane (A1) relative to the amount of the Zr of the Unsupported Molecular Ligand-Metal Complex Procatalyst 1 to give a polyolefin. Catalyst compositions are reported later in Table 1 and polyolefin characterization data are reported later in Tables 2 and 3.

IE3. Activate unsupported Molecular Ligand-Metal Complex Procatalyst 1 with organoborate (G1) in compound (C1) and then trialkylaluminum (I1) to form unsupported Molecular Ligand-Metal Complex Catalyst 1B. Combine the unsupported Molecular Ligand-Metal Complex Catalyst 1B with Magnesium chloride-supported titanium procatalyst (B1) of Preparation P1 to yield a catalyst mixture which is used immediately in batch reactor polymerization containing a polymerizable olefin (e.g., ethylene and 1-octene) to produce a polyolefin. Catalyst compositions are reported below in Table 1 and polyolefin characterization data are reported later in Tables 2 and 3.

IE4. Mix unsupported Molecular Ligand-Metal Complex Procatalyst 1 with Magnesium chloride-supported titanium procatalyst (B1) of Preparation P1 to give a mixture. Activate the mixture's procatalysts with organoborate (G1) in compound (C1) and then hydrocarbylaluminoxane (A1) to form a catalyst mixture 1C that includes a Ziegler-Natta catalyst and an unsupported Molecular Ligand-Metal Complex Catalyst. Use the catalyst mixture immediately in batch reactor polymerization containing a polymerizable olefin (e.g., ethylene and 1-octene) to produce a polyolefin. Catalyst compositions are reported below in Table 1 and polyolefin characterization data are reported later in Tables 2 and 3.

IE5. Activate Magnesium chloride-supported titanium procatalyst (B1) of Preparation P1 with hydrocarbylaluminoxane (A1) to give a first mixture. To the first mixture add unsupported Molecular Ligand-Metal Complex Procatalyst 1 to give a second mixture. Activate the second mixture with organoborate (G1) in compound (C1) to yield a catalyst mixture 1D that includes a Ziegler-Natta catalyst and an unsupported Molecular Ligand-Metal Complex Catalyst. Catalyst mixture 1D is used immediately in batch reactor polymerization containing a polymerizable olefin (e.g., ethylene and 1-octene) to produce a polyolefin. Catalyst compositions are reported later in Table 1 and polyolefin characterization data are reported later in Tables 2 and 3.

TABLE 1

Catalyst Compositions.

| Ex. No. | Z-N Cat. | Ti loading (μmol) | Al Activator | Zr loading (μmol) | (A1)/Zr (mol/mol) | (G1)/Zr (mol/mol) | (I1)/Ti (mol/mol) |
|---|---|---|---|---|---|---|---|
| IE1 | P1 | 1.50 | (A1) | 1.10 | 50 | 1.2 | N/a |
| IE2 | P1 | 1.50 | (A1) | 1.10 | 100 | 2.4 | N/a |
| IE3 | P1 | 1.50 | (I1) | 1.10 | N/A | 2.4 | 7.7 |
| IE4 | P1 | 1.50 | (A1) | 1.10 | 100 | 2.4 | N/a |
| IE5 | P3A | 1.50 | (A1) | 1.10 | 100 | 2.4 | N/a |

N/A means not applicable.

The catalysts in IE1 to IE5 had efficiencies and the polyolefins produced in IE1 to IE5 had densities shown in Table 2.

TABLE 2

Polyolefin Characterization Data.

| Ex. No. | Cat. Eff. | Density (g/mL) |
|---|---|---|
| IE1 | 252600 | 0.9160 |
| IE2 | 245300 | 0.8978 |
| IE3 | 358600 | N/r |
| IE4 | 257100 | 0.8977 |
| IE5 | 244800 | 0.9140 |

N/r not reported.

The polyolefins produced in IE1 to IE5 had four peak mass fractions (Wt (%)) of polyolefin at reaction temperatures at about 29° C. (Wt1(%)), about 53° C. (Wt2(%)), about 80° C. (Wt3(%)), and about 99° C. (Wt4(%)), and corresponding weight average molecular weights Mw1, Mw2, Mw3, and Mw4, respectively, shown in Table 3.

TABLE 3

Polyolefin Characterization Data.

| Ex. No. | Wt1 (%) | Wt2 (%) | Wt3 (%) | Wt4 (%) | Wt2/Wt3 | Mw1 (g/mol) | Mw2 (g/mol) | Mw3 (g/mol) | Mw4 (g/mol) |
|---|---|---|---|---|---|---|---|---|---|
| IE1 | 6.7 | 33 | 41 | 19 | 0.80 | 33900 | 80200 | 61200 | 110800 |
| IE2 | 7.3 | 40 | 35 | 17 | 1.14 | 39100 | 92600 | 67100 | 132800 |
| IE3 | 5.6 | 28 | 49 | 18 | 0.57 | 21600 | 78700 | 73400 | 136500 |
| IE4 | 6.8 | 34 | 39 | 20 | 0.87 | 41800 | 86300 | 62100 | 112400 |
| IE5 | 2.9 | 32 | 45 | 21 | 0.71 | 31400 | 83700 | 61500 | 110600 |

The data in Tables 1, 2 and 3 show that the enhanced Ziegler-Natta catalyst and the unsupported molecular catalyst of IE1, the enhanced Ziegler-Natta catalyst and the unsupported molecular catalyst of IE2, and the Ziegler-Natta catalyst and the unsupported molecular catalyst of IE3 are each compatible in a same reactor at the same time and are effective for catalyzing polymerizations of polymerizable olefins. The Tables 2 and 3 data show the combination of the (enhanced) Ziegler-Natta catalyst and the unsupported molecular catalyst has satisfactory catalyst efficiency and produces a polyolefin comprising a polymer from the (enhanced) Ziegler-Natta catalyst and a polymer from the unsupported molecular catalyst. The Table 3 data show the unsupported molecular catalyst had better activity with activator (A1) MMAO-3A than with activator (11) triethylaluminum: e.g., polyolefin products of IE1, IE2, IE4, and IE5 had higher Wt2/Wt3 than the Wt2/Wt3 of polyolefin product of IE3; and polyolefin products of IE1, IE2, IE4, and IE5 had higher Mw2 than the Mw2 of the polyolefin product of IE3.

The invention claimed is:

1. A method of polymerizing an olefin using a Ziegler-Natta catalyst and an unsupported molecular catalyst in a same reactor at the same time, the method comprising simultaneously contacting at least one polymerizable olefin in the reactor with the Ziegler-Natta catalyst and the unsupported molecular catalyst in a saturated or aromatic hydrocarbon liquid under effective conditions to give a polyolefin product comprising a mixture of a first polyolefin made by a first polymerization reaction catalyzed by the Ziegler-Natta catalyst and a second polyolefin made by a second polymerization reaction catalyzed by the unsupported molecular catalyst;

wherein the Ziegler-Natta catalyst is an efficiency-enhanced Ziegler-Natta catalyst that consists essentially of a product of a first activation reaction of (A) a hydrocarbylaluminoxane and (B) a magnesium halide-supported titanium procatalyst in (C) a saturated or aromatic hydrocarbon liquid;

wherein the (B) magnesium halide-supported titanium procatalyst is prepared by contacting (D) a solid particulate consisting essentially of magnesium halide with (E) titanium tetrachloride in the (C) saturated or aromatic hydrocarbon liquid so as to give the (B) magnesium halide-supported titanium procatalyst;

wherein the (D) solid particulate consists essentially of greater than 95 mole percent of the magnesium halide; and wherein the unsupported molecular catalyst consists essentially of a product of a third activation reaction of an unsupported molecular ligand-metal complex procatalyst with (A) a hydrocarbylaluminoxane.

2. The method of claim 1 wherein the contacting comprises: (i) adding a first feed of the Ziegler-Natta catalyst and a second feed of the unsupported molecular catalyst into the reactor, which contains the at least one polymerizable olefin, wherein the first and second feeds are different; (ii) adding a first feed of the Ziegler-Natta catalyst into the reactor and preparing the unsupported molecular catalyst in situ in the reactor, wherein the unsupported molecular catalyst is prepared in situ in the reactor by adding a third feed containing the unsupported molecular ligand-metal complex procatalyst and a fourth feed containing the (A) hydrocarbylaluminoxane into the reactor, which contains the at least one polymerizable olefin, wherein the first and third feeds are the same or different and wherein the first and fourth feeds are the same or different, with the proviso that the third and fourth feeds are different; (iii) adding a second feed of the unsupported molecular catalyst into the reactor and preparing the Ziegler-Natta catalyst in situ in the reactor, wherein the Ziegler-Natta catalyst is prepared in situ in the reactor by adding a fifth feed containing the suspension of the (B) magnesium halide-supported titanium procatalyst in the (C) saturated or aromatic hydrocarbon liquid and free of (lacking) the trialkylaluminum and a sixth feed containing the (A) hydrocarbylaluminoxane and containing the trialkylaluminum, into the reactor, which contains the at least one polymerizable olefin, wherein the second and fifth feeds are the same or different and wherein the second and sixth feeds are the same or different, with the proviso that the fifth and sixth feeds are different; or (iv) adding a seventh feed of the suspension of the (B) magnesium halide-supported titanium procatalyst in the (C) saturated or aromatic hydrocarbon liquid and the unsupported molecular ligand-metal complex procatalyst and an eighth feed of the (A) hydrocarbylaluminoxane or a mixture of the (A) hydrocarbylaluminoxane and the trialkylaluminum into the reactor, which contains the at least one polymerizable olefin, wherein the seventh and eighth feeds are different.

3. The method of claim 1 wherein the first or second activation reaction further comprises contacting at least one of the (B) magnesium halide-supported titanium procatalyst with (G) an organoborate or (H) an organoboron; and/or the third activation reaction further comprises contacting the unsupported molecular ligand-metal complex procatalyst with (G) an organoborate or (H) an organoboron.

4. The method of claim 1 wherein: (i) the at least one polymerizable olefin is ethylene and the polyolefin product comprises a polyethylene; (ii) the at least one polymerizable olefin is at least one ($C_3$-$C_{40}$)alpha-olefin and the polyolefin product comprises a poly(($C_3$-$C_{40}$)alpha-olefin); or (iii) the at least one polymerizable olefin comprises a combination of ethylene and at least one ($C_3$-$C_{40}$)alpha-olefin and the polyolefin product comprises a poly(ethylene-co-($C_3$-$C_{40}$)alpha-olefin) copolymer.

5. The method of claim 1 wherein: (i) the (B) magnesium halide-supported titanium procatalyst is free of Al (molar ratio Al/Mg=0); (ii) the (B) magnesium halide-supported titanium procatalyst has molar ratio Al/Mg from >0 to <0.05; (iii) the magnesium halide of the (B) magnesium halide-supported titanium procatalyst is magnesium chloride; (iv) the magnesium halide of the (B) magnesium halide-supported titanium procatalyst is magnesium bromide; (v) both (i) and (iii); (vi) both (i) and (iv); (vii) both (ii) and (iii); or (viii) both (ii) and (iv).

6. The method of claim 1 wherein: (i) the (D) solid particulate consisting essentially of magnesium halide has a Brunauer, Emmett, Teller (BET) surface area of ≥200 square meters per gram ($m^2$/g) as measured by BET Surface Area Method; or (ii) the (D) solid particulate consisting essentially of magnesium halide has been prepared by contacting a solution of (F) a dialkylmagnesium compound dissolved in the (C) saturated or aromatic hydrocarbon liquid with 1.95 to 2.05 mole equivalents of hydrogen halide to give a suspension of the (D) solid particulate consisting essentially of magnesium halide in the (C) saturated or aromatic hydrocarbon liquid; or (iii) both (i) and (ii).

7. The method of claim 1 wherein the (C) saturated or aromatic hydrocarbon liquid is: (i) a saturated hydrocarbon liquid; or (ii) an aromatic hydrocarbon liquid; or (iii) a mixture of saturated hydrocarbon and aromatic hydrocarbon liquids.

8. The method of claim 1 wherein the (A) hydrocarbylaluminoxane is an alkylaluminoxane, a polymethylaluminoxane, an arylaluminoxane, an aralkylaluminoxane, or a combination of any two or more thereof.

9. The method of claim 1 wherein the unsupported molecular ligand-metal complex procatalyst comprises an unsupported form of: (i) a cyclopentadienyl ligand-metal complex procatalyst; (ii) a cyclopentadienyl-free ligand-metal complex procatalyst; or (iii) both (i) and (ii).

10. A polymerization method of polymerizing an olefin using an efficiency-enhanced Ziegler-Natta catalyst and an unsupported or supported molecular catalyst in solution-phase process in a same reactor at the same time, wherein the efficiency-enhanced Ziegler-Natta catalyst consists essentially of a product of a first activation reaction of (A) a hydrocarbylaluminoxane and (B) a magnesium halide-supported titanium procatalyst in (C) a saturated or aromatic hydrocarbon liquid, wherein the (B) magnesium halide-supported titanium procatalyst is prepared by contacting (D) a solid particulate consisting essentially of magnesium halide with (E) titanium tetrachloride in the (C) saturated or aromatic hydrocarbon liquid so as to give the (B) magnesium halide-supported titanium procatalyst; and wherein the unsupported or supported molecular catalyst consists essentially of a product of a third activation reaction of an unsupported or supported molecular ligand-metal complex procatalyst with (A) a hydrocarbylaluminoxane and/or (G) an organoborate or (H) an organoboron; the method comprising simultaneously contacting at least one polymerizable olefin in the solution phase in the reactor with the efficiency-enhanced Ziegler-Natta catalyst and the unsupported or supported molecular catalyst in a saturated or aromatic hydrocarbon liquid under effective conditions to give a polyolefin product comprising a mixture of a third polyolefin made by a third polymerization reaction catalyzed by the Ziegler-Natta catalyst and a fourth polyolefin made by a fourth polymerization reaction catalyzed by the unsupported or supported molecular catalyst; wherein the (D) solid particulate consists essentially of greater than 95 mole percent of the magnesium halide.

11. A catalyst system comprising the efficiency-enhanced Ziegler-Natta catalyst and unsupported or supported molecular catalyst as described in claim 10.

\* \* \* \* \*